United States Patent
Stoll et al.

(10) Patent No.: US 6,663,078 B1
(45) Date of Patent: Dec. 16, 2003

(54) MICROVALVE

(75) Inventors: Kurt Stoll, Esslingen (DE); Peter Post, Nellingen-Ostfildern (DE); Michael Weinmann, Plüderhausen (DE); Herbert Vollmer, Notzingen (DE); Andreas Muth, Kirchheim/Teck (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/700,221

(22) PCT Filed: May 8, 1999

(86) PCT No.: PCT/EP99/03165

§ 371 (c)(1),
(2), (4) Date: Nov. 13, 2000

(87) PCT Pub. No.: WO99/58860

PCT Pub. Date: Nov. 18, 1999

(30) Foreign Application Priority Data

May 14, 1998 (DE) .......................................... 198 21 638

(51) Int. Cl.⁷ .............................................. F16K 31/02
(52) U.S. Cl. ............................... 251/129.06; 251/129.01
(58) Field of Search .................... 251/11, 129.01, 251/129.06; 60/527, 528, 529; 137/831, 833

(56) References Cited

U.S. PATENT DOCUMENTS

| 4,530,317 A | * | 7/1985 | Schutten ............... 251/129.06 |
| 4,756,508 A | * | 7/1988 | Giachino et al. ...... 251/129.06 |
| 4,826,131 A | | 5/1989 | Mikkor |

(List continued on next page.)

FOREIGN PATENT DOCUMENTS

| DE | 3006231 A1 | * | 8/1981 | ............ 251/129.06 |
| DE | 44 17 251 A1 | | 11/1995 | |
| DE | 195 22 806 A1 | | 1/1997 | |
| DE | 195 22 806 C2 | | 6/1997 | |
| EP | 0400482 | * | 12/1990 | ............ 251/129.06 |
| EP | 0 485 739 A1 | | 5/1992 | |
| FR | 2642812 | * | 8/1990 | ............ 251/129.06 |
| JP | 04-1418 | | 1/1992 | |
| JP | 04-015377 | | 1/1992 | |
| JP | 05-026903 | | 2/1993 | |

OTHER PUBLICATIONS

Kohl, M, Skrobanek, K.D. and Miyazaki, S., "Development of Stress–Optimised Shape Memory Microvalves," *Sensors and Accuators*, vol. 72, No. 3, Feb. 16, 1999, pp. 243–250.
Patent Abstracts of Japan, Publication No. 07229579, Aug. 29, 1995.
Patent Abstracts of Japan, Publication No. 06341556, Dec. 13, 1994.
Patent Abstracts of Japan, Publication No. 07158757, Jun. 20, 1995.
Huff, M.A., Gilbert, J.R. and Schmidt, M.A., "Flow Characteristics of a Pressure–Balanced Microvalve," *International Conference on Solid–State Sensors and Actuators*, Jun. 7, 1993, pp. 98–101.

*Primary Examiner*—George L. Walton
(74) *Attorney, Agent, or Firm*—Hoffmann & Baron, LLP (57) ABSTRACT

A microvalve, which contains a valve member (7) dividing a valve chamber (13) into two chamber parts (14 and 15). A first chamber part (14) is delimited by a duct layer (3), which has an input flow opening (17) and at least one output flow opening (22 and 23). Fluid transfer between the input flow opening (17) and the output flow opening (22 and 23) may be controlled by the valve member (7). Furthermore pressure relieving means are provided which are effective in the open position of the valve member (7), such means comprising at least one expansion recess (38) provided on the valve member and with at least partial overlap opposite to the output flow opening (22 and 23), same permitting an expansion of the transferring fluid. It is connected through valve member (7) with the second chamber part (15) so that a counter pressure may build up here causing the relief of pressure.

15 Claims, 5 Drawing Sheets

U.S. PATENT DOCUMENTS

| | | | | |
|---|---|---|---|---|
| 4,971,106 A | * 11/1990 | Tsutsui et al. | .......... | 251/129.06 |
| 5,271,724 A | * 12/1993 | Van Lintel | ............. | 251/129.06 |
| 5,323,999 A | * 6/1994 | Bonne et al. | .......... | 251/129.06 |
| 5,785,295 A | 7/1998 | Tsai | | |
| 5,975,485 A | * 11/1999 | Tasi et al. | ............... | 251/129.06 |
| 6,003,833 A | * 12/1999 | Tasi et al. | ............... | 251/129.06 |
| 6,032,689 A | * 3/2000 | Tsai et al. | ...................... | 251/11 |
| 6,142,444 A | * 11/2000 | Kluge | ................... | 251/129.06 |

* cited by examiner

MICROVALVE

FIELD OF THE INVENTION

The invention relates to a microvalve that is to say a micromechanical valve produced by microfabrication. Microvalves of this type as a rule possesses a multi-layer structure, the individual layers being, dependent on the material thereof, fabricated by etching or molding techniques. Possible designs of such a microvalve will be gathered from the European patent publication 0 485 739 A1 disclosing a plate-like valve member forming a moving component of a valve member layer. The valve member layer is placed between two duct layers possessing input and output flow ducts, whose connection may be controlled by way of moving valve member.

BACKGROUND OF THE INVENTION

In the microvalve art there is generally the problem that the switching forces most frequently employed and produced by way of actuating means operating on the electrostatic principle of action, are massively reduced by an increase in the electrode spacing. In order to nevertheless provide a sufficiently large switching stroke of the valve member and accompanying high flow rates, large electrode areas, and accordingly large valve member areas, are required. Such large areas do however entail the disadvantage of a substantial sensitivity with respect to pressure differentials between the two chamber parts separated by way of the valve member in the valve chamber, something which may impair the ability of the microvalve to function in a substantial manner.

OBJECTS AND SUMMARY OF THE INVENTION

One object of the present invention is to provide a microvalve, whose sensitivity to pressure differences is reduced to maintain a more reliable manner of operation.

This object is achieved by a microvalve, which comprises a valve chamber, in which a diaphragm- or plate-like valve member is located dividing the valve chamber into two chamber parts, comprising a duct layer placed opposite to the valve member and delimiting a first one of the two chamber parts, such duct layer on its side facing the valve member having an input flow opening communicating with an input flow duct and at least one output flow opening communicating with an output flow duct, such valve member being able to be shifted between a closed position closing the input flow opening and an open position opening the input flow opening and thus rendering possible transfer of fluid from the input flow duct to the output flow duct through the first chamber part, and pressure relieving means effective in the open position of the valve member, such means having at least one expansion recess provided, with at least partial overlap, opposite to the output flow opening on the valve member and permitting an expansion of the transferring fluid, such expansion recess communicating through the valve member with the second chamber part.

It is in this manner that a microvalve is provided, which while having a relatively large area of the valve member moving athwart its direction of extent, is substantially less liable to functional impairment by pressure differentials between the two chamber parts. This is rendered possible in effect since the two chamber parts may communicate with one another fluidwise through the valve member, an expansion recess being provided on the side, facing the input flow opening and the output flow opening, of the valve member of the respective output flow opening, such expansion recess positively influencing the fluid, which flows from the input flow duct to the output flow duct in the open position, and more particularly compressed air, in its flow behavior. Without such pressure relieving means the fluid flowing into the first chamber part would spread out over entire valve member area at a high velocity and cause a rapid build up of pressure between the valve member area and the duct layer, such pressure then constituting a large force opposing any immediately following switching over of the valve member. In the portion opposite to the output flow opening the expansion recess will now lead to an expansion and turbulent flow of the flow which has just been accelerated, something which reduces the flow velocity and favors the flow of the fluid into the output flow duct. Simultaneously the fluid, which is caught or retarded by the expansion recess, is free to pass through the valve member directly to the oppositely placed chamber part so that at this point a counter-pressure, corresponding to the pressure in the first chamber part, builds up and the valve member is at least substantially relieved of pressure or is pressure compensated. A further, following switching over operation can now take place extremely reliably with the existing actuating forces.

Further advantageous developments of the invention are defined in the dependent claims.

Particularly effective, delay-free, relief of pressure takes place if the expansion recess is so designed that the output flow opening associated with it is completely overlapped by it. In this case the mutually opposite openings may hate the same width.

Preferably the expansion recesses are so far spaced from the input flow opening in the direction athwart the switching direction that in the open position direct entry of fluid from the input flow duct is prevented. This ensures that the input fluid is not immediately blasted through the second chamber part to establish a gage pressure which would urge the valve member toward its closed position.

It would be possible to design the expansion recess in the form of a slot-like cutout extending through the valve member athwart the direction of its extent. In order to ensure improved mechanical strength of the valve member however a configuration is however preferred, in the case of which the expansion recess is made like a longitudinal groove, it communicating via at least one relief duct, which extends through the valve member, with the second chamber part. Instead of a single relief duct it is possible as well to provide a plurality of expansion ducts, which open into the expansion recess with a spacing between them. Despite the presence of the connecting ducts extending through the valve member, there is accordingly a design of the valve member which is resistant to bending and twisting, something which in particular also promotes cooperation between the valve member and the opening to be closed in the closed position.

A particularly advantageous design of the microvalve possesses a linear, slot-like input flow opening, which on both longitudinal sides is flanked respectively by an output flow opening, also having a longitudinal form and aligned in parallelism, each output flow duct being opposite to an expansion recess provided on the valve member. The input fluid is therefore able to spread out in the first space part toward opposite sides, it however being retarded after only a short travel in the above mentioned manner and being caused to flow into the output flow ducts and the second chamber part.

In order to improve the pressure relieving effect even farther the design may be such that, as related to the transfer direction of the fluid, an expansion recess is followed by one or more additional expansion recesses, which although same do not have any output flow opening opposite to them, nevertheless communicate also with the second chamber part and compel flow of the fluid, at the preceding expansion recess, to the opposite second chamber part in a similar manner.

A particularly advantageous design of the valve member, which unites satisfactory flow behavior with high mechanical strength and also manufacturing advantages, is such that in both valve member areas there is respectively a group of mutually parallel groove-like recesses, the recesses of the two groups extending transversely in relation to each other and having a depth such that at points of intersection they merge with one another, at least one expansion recess and, if necessary, at least one additional expansion recess being a component of the recesses associated with the first chamber part.

The second chamber part is delimited by a further layer opposite to the valve member, such further layer being in the form of a ductless covering layer, or of a further duct layer containing at least one fluid duct, dependent on the type of valve.

In the following the invention will be described in detail with reference to a working example depicted in the drawings.

DETAILED DESCRIPTION OF THE PREFERRED EMBODIMENTS

Figure 3:
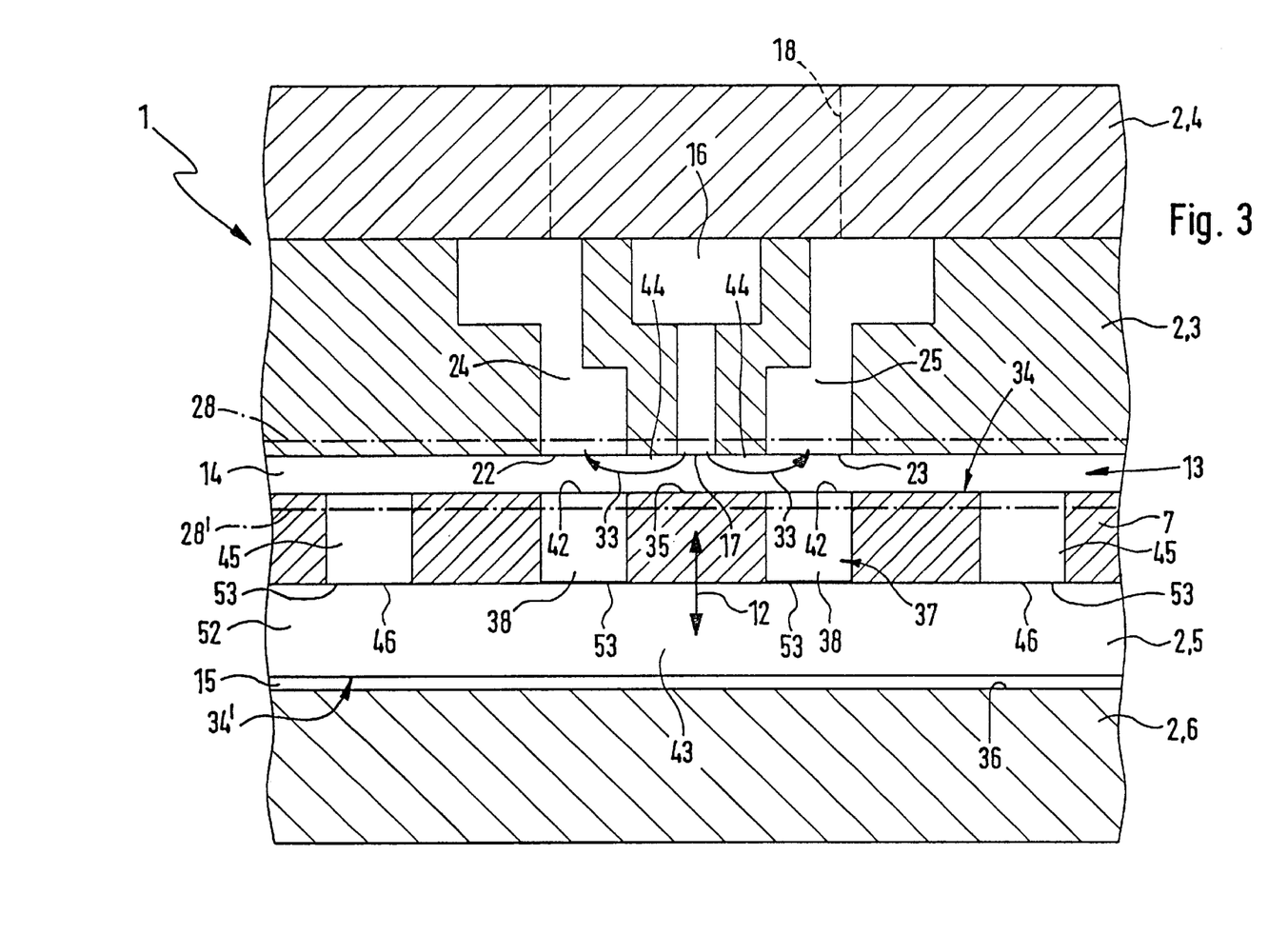
FIG. 3 shows part of the sectional view of FIG. 2 on a larger scale with the individual layers on top of each other and on a still larger scale.
Figure 4:
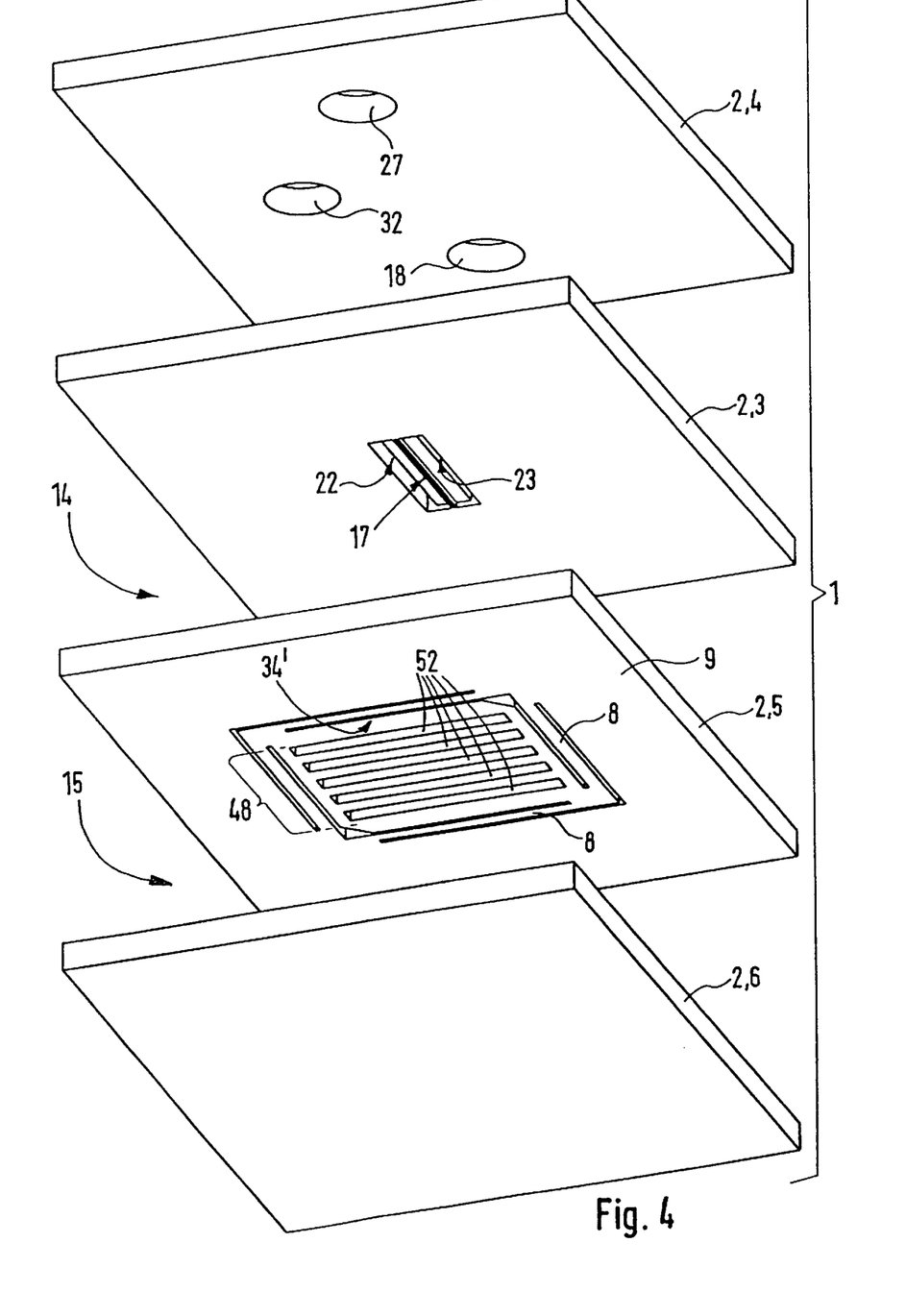
FIG. 4 shows an exploded view similar to that of FIG. 1, of the microvalve looking toward the opposite layer faces.

The microvalve generally reference 1 may be manufactured using known methods of microfabrication. It has a plurality of plate-like layers 2—in the working example namely four thereof—which as a rule are separately microfabricated and then placed together with their layer faces parallel to each other (flatwise) and are then permanently joined together. The resulting layer or sandwich structure is clearly indicated in FIG. 3.

Figure 5:
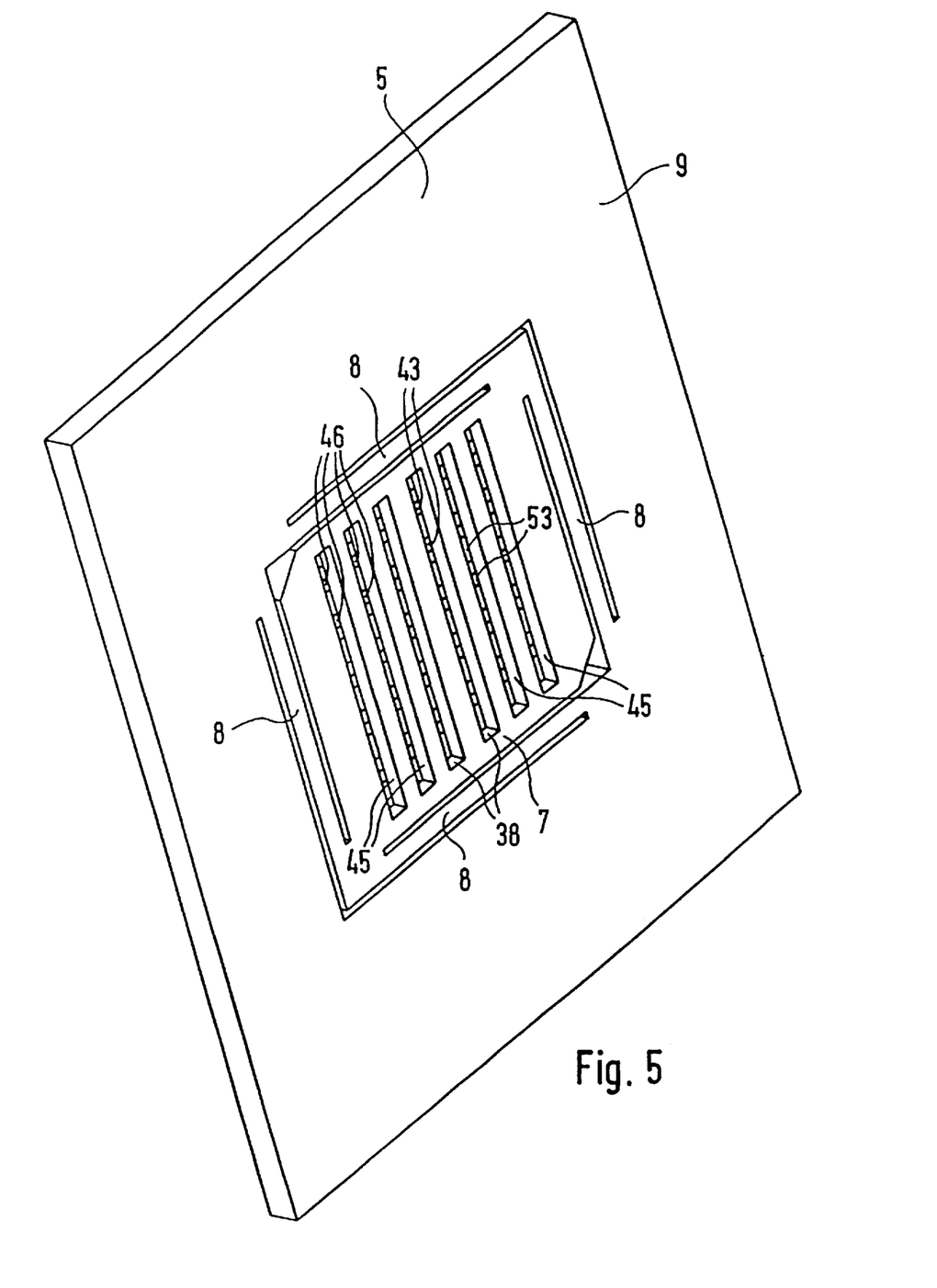
FIG. 5 is a separate view of the valve member layer employed in the microvalve presented by way of example, looking obliquely toward the layer side facing the duct layer, and generally as indicated by the arrow V of FIG. 1.

Underneath the layers 2 of the microvalve 1 presented here as an example a duct layer 3 is located, which on its one side is flanked by a connection layer 4 and on its other side is flanked by a valve member layer 5, which is followed by a covering layer 6. FIG. 5 shows a separate view of the valve member layer 5.

Using the material of the valve member layer 5 an inherently rigid plate-like valve member 7 is microfabricated. Same is integrally joined via a plurality of bendingly flexible holding arms 8 with a frame-like layer base 9 surrounding it. It is in this manner that the valve member 7 is able to be moved at a right angle to the direction of extent of the valve member layer 5 in relation to the layer base 9, such motion being a switching movement as indicated by the double arrow 12.

The frame-like layer base 9 of the valve member layer 5 delimits, together with the duct layer 3 and the covering layer 6, a valve chamber 13 receiving the valve member 7. By means of the valve member 7 the valve chamber 13 is divided into a first chamber part 14 facing the duct layer 3 and a second chamber part 15 facing the covering layer 6.

The duct layer 3 contains an input flow duct 16. It extends through the duct layer 3 preferably at a right angle to the plane of its extent. It opens at an slot-like input flow opening 17, which more particularly has a linear longitudinal configuration, into the first chamber part 14. On the other side it communicates with a connection opening 18 extending through the connection layer 4, such opening 18 rendering possible the connection of fluid ducts or fluid conductors leading to further items of equipment. In the working embodiment illustrated a connection of the first connection opening 18 with a pneumatic pressure supply is provided.

The input flow opening 17 is preferably flanked on the two longitudinal sides by a respective output flow opening 22 and 23. These two output flow openings 22 and 23 also preferably have a linear elongated configuration and extend at a small distance from the input flow opening 17 parallel to it. It is convenient for them to have the same length as the input flow opening 17 and at the same level as it.

Each output flow opening 22 and 23 constitutes the one end of an output flow duct 24 and 25 extending in the duct layer 3 and preferably crossing it athwart the plane of extent.

Figure 1:
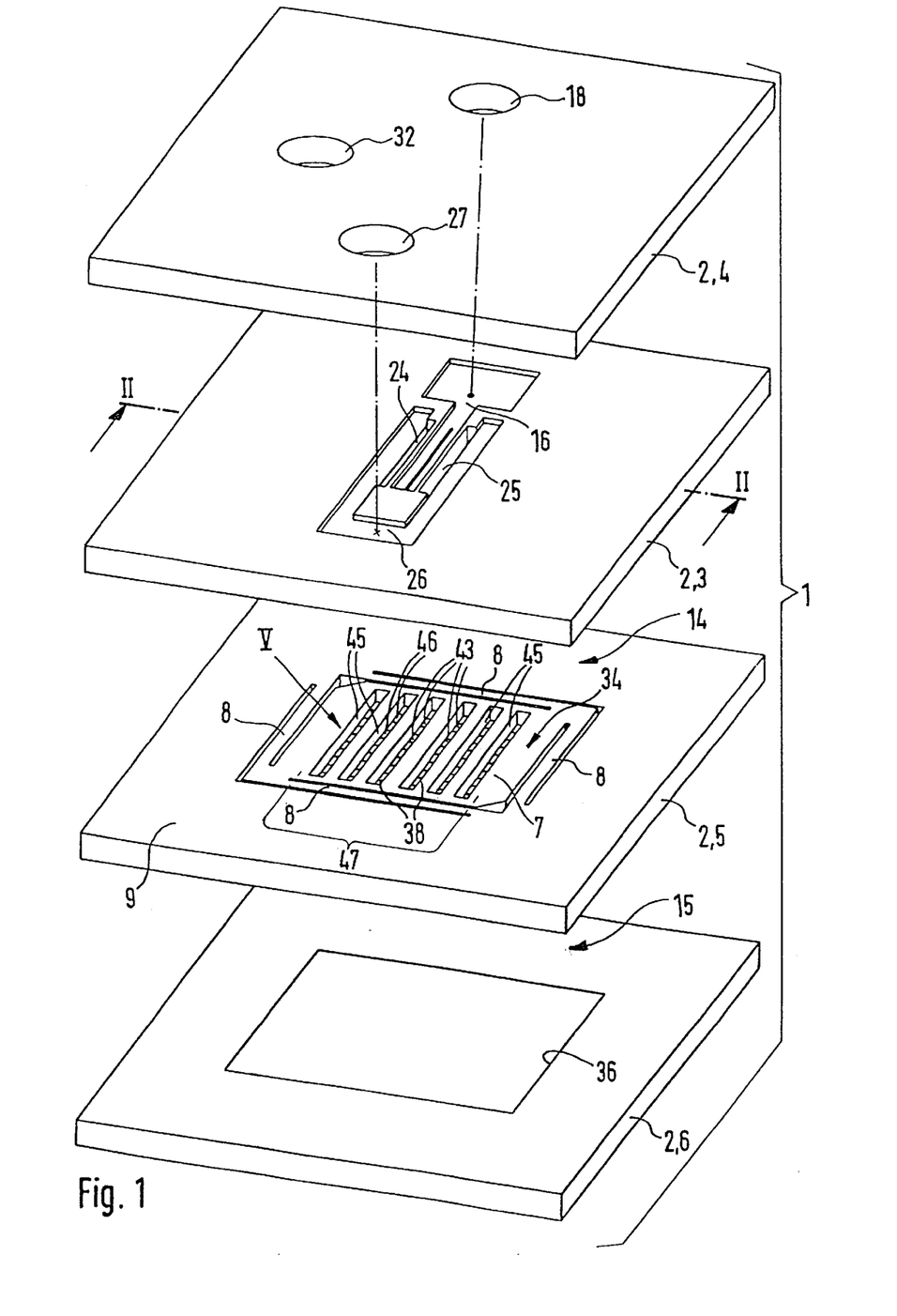
FIG. 1 shows a preferred design of the microvalve of the invention in an enlarged exploded view, the layers, which are normally fixed together, being shown in a state lifted clear of one another.
Figure 2:
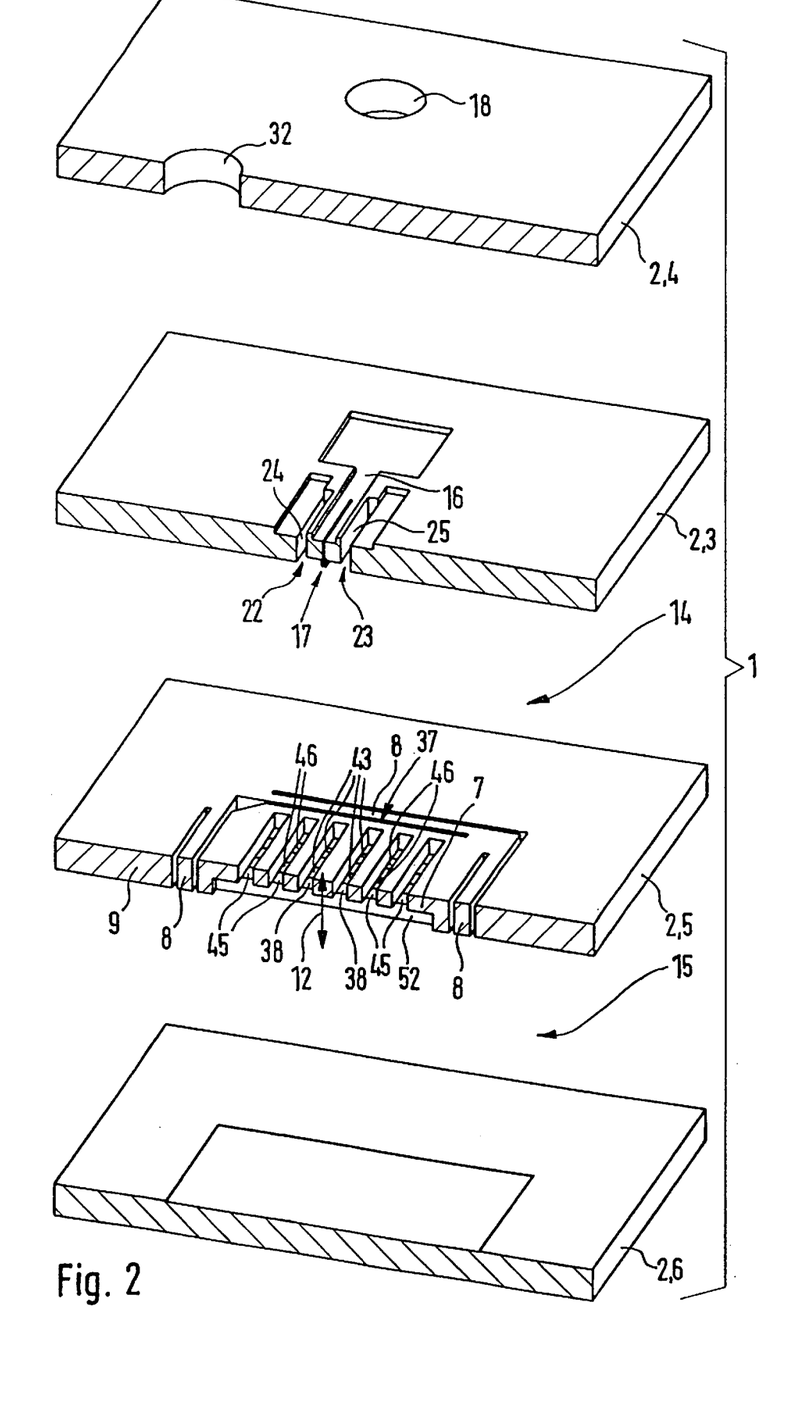
FIG. 2 shows the microvalve of FIG. 1 in a similar manner of representation with a cross section taken through all the layers on the section line II—II of FIG. 1.

It will be clear from FIG. 1 that the two output flow ducts 24 and 25 may be connected together. For instance, they may communicate with each other via a connecting groove 26 machined in the duct layer 3 on the same side as the connection layer 4, such duct 26 for its part communicating with a second connection opening 27, overlapping it, in the connection layer 4. The second connection opening 27 as well is provided for connection with fluid ducts or conductors leading to other equipment and in the working embodiment serves for the connection of a load to be run on compressed air, as for example a pneumatic cylinder.

To make the design compact in the working example the connection groove 26 is of U-like configuration and placed around the input flow duct 16.

With the aid of an electrically operated actuator not illustrated in detail it is possible for the valve member 7 to be shifted to perform a switching movement 12 in order to move it between an open position and a closed position. It is convenient for an actuator operating electrostatically to be utilized, and which has two electrodes 28 and 28' representing the plates of a capacitor, of which one is provided on the duct layer 3 and the other is provided on the valve member 7, each being in the first chamber part 14. The electrodes 28 and 28' may be constituted by the respective layer material itself or by additionally applied bodies. The electrical leads extend to the outside in a manner which is not illustrated, it being possible for a further opening 32 in the connection layer 4 to be made use of.

The microvalve 1 of the working example is of the normally open type. As long as no voltage is applied to the electrodes 28 and 28', the valve member will dwell in the open position illustrated in FIG. 3, in the case of which, owing to the design of the holding arms 8, it is at a greater distance from the duct layer 3. In this open position it is possible for a fluid supplied under pressure via the input flow duct 16 to flow through the first chamber part 14 into the two output flow ducts 24 and 25 as indicated by the arrows 33.

The application of a voltage to the electrodes 28 and 28' results in attraction of the valve member 7 toward the duct layer 3 until a closure area 35 provided on the first valve member face 34 facing the first chamber part 14, covers the input flow opening 17 in a fluid-tight manner. The closure area 35 is therefore also made elongated in the working example. If flow opening 17 is closed the valve member 7 will be in the closed position.

If needed it is possible, for improving the sealing effect in the circumferential area of the input flow opening 17, to provide a peripheral sealing edge on the duct layer 3 and/or on the valve member 7.

On the side, opposite to the valve member 7, the second chamber part 15 is delimited by the covering layer 6. In the present design of the microvalve as a 2/2 switching valve the covering layer is free of ducts and in the form of a plain cover. In order for the valve member 7 to have a sufficient stroke it is possible for the covering layer 6 however to have a recess 36 on its inner face corresponding in size at least to the outline of the moving valve member 7.

For forming a different type of valve, as for instance a 3/2 switching valve, it would be possible for the covering layer also to possess at least one duct so that it as well would constitute a duct layer. If required a still further connection layer could be provided on this layer.

If the microvalve is moved out of the closed position into the open position, the input fluid would normally spread out suddenly via the entire first chamber 14, that is to say via the gap located between the valve member 7 and the duct layer 3. The pressure differential then initially existing between the two chamber parts 14 and 15—equalization of pressure would only take place when the fluid entering via the cutouts in the vicinity of the holding arms 8 has filled up the second chamber part 15—would thrust the valve member 7 against the covering layer 6 so that the actuating forces would be subject to high opposing forces, which would hinder renewed brisk switching back into the closed position. The microvalve 1 is accordingly provided with pressure relieving means 37 effective in the open position of the valve member 7.

The pressure relief means 37 comprise a number of expansion recesses 38 equal in number to the number of output flow openings 22 and 23, which recesses are provided in the first valve member area 34 of the valve member 7. Each output flow opening 22 and 23 is in the switching direction 12 opposite to one of the expansion recesses 38 at a facing opening 42. In this case there is an at least partial overlap between each output flow opening 22 and 23 and the associated expansion recess 38 so that in other words a respective output flow opening 22 and 23 and the opening 42, facing it, of the associated expansion recess 38 at least partially overlap as seen looking in the switching direction 12.

In the working embodiment a complete overlap of the output flow opening 22 and 23 with the openings 42 opposite to them is provided for. Here the openings 42 of the expansion recesses 38 are made like slots with a linear elongated form and as regards the input flow opening 17 and the output flow opening 22 and 23 they have a parallel arrangement.

Moreover it is convenient for the output flow openings 22 and 23 associated with each other in pairs and the slot-like openings 42 of the expansion recesses 38 to have the same width and for them to be directly opposite to each other at aligned limiting edges.

Owing to the paired arrangement of the expansion recesses 38 in the working embodiment there is such a form of the valve member 7 that the closure region 35 is respectively flanked on opposite longitudinal sides by respectively one of the two expansion recesses 38.

The expansion recesses 38 are furthermore connected through the valve member 7 with the second chamber part 15 for constant passage of fluid. In the working embodiment this is made possible since the expansion recesses 38 are made like grooves with an elongated shape and communicate via several relief ducts 43 with the second chamber part 15. These relief ducts 43 open at points spaced out in the longitudinal direction of the respective expansion recess 38 into the respective expansion recess 38.

The arrangement and alignment of the expansion recesses 38 is such that their longitudinal extent is athwart the transfer direction of the fluid flowing as indicated by the arrows 33 from the input flow opening 17 to the output flow openings 22 and 23. After entering the first chamber part 14 the fluid flowing via the input flow opening 17 will firstly be diverted by the valve member 7 athwart the longitudinal direction of the input flow opening 17 and in the chamber part sections 44 adjoining the input flow opening 17 on either side, will be accelerated with a sort of nozzle effect owing to narrowness of the flow cross section which is available. Following this the fluid flow however passes into the vicinity of the oppositely placed output flow openings 22 and 23 and expansion recesses 38, where the accelerated pressure medium may expand turbulently and forms a sort of expansion bubble, something which simultaneously means a substantial reduction in the flow velocity. Accordingly on the one hand the necessary diversion or change in direction of the fluid flow into the output flow ducts 24 and 25 is promoted. Furthermore a preferential flow direction through the expansion recesses 38 and the relief ducts 43 to the second chamber part 15 becomes established. The latter means that there is a rapid build up of pressure in the second chamber part 15 as well so that at its opposite valve member areas the valve member 7 is subjected within a very short time to the same pressure. This means that the valve member 7 is relieved of pressure and the pressure forces acting on it are reduced to a minimum. As a result the actuator provided is in a position of performing rapid switching operations. It would be possible to have the expansion recesses 38 in the form of slot-like cutouts, which extend through the valve member 7 for its full thickness. A division up of the fluid connection into individual relief ducts 43 does however offer the advantage of maintaining a robust, stiff structure of the valve member 7, something which has a favorable effect as regards the switching behavior and the sealing qualities in the closed position.

In order to still further improve the pressure equalizing velocity the valve member 7 of the embodiment of the invention is provided on the first valve member face 34 with further recesses, which form additional expansion recesses 45. They may give rise to a further expansion of the fluid flow, which moves past the preceding or upstream expansion recesses 38 to the edge of the valve chamber 13.

On the mutually opposite longitudinal sides of both expansion recesses 38 there is in each case at least one space additional expansion recess 45 with a parallel configuration.

In the working embodiment illustrated it is convenient to provide respectively two mutually spaced additional expansion recesses 45. Their configuration is conveniently the same as that of the expansion recesses so that they as well communicate via their additional relief ducts 46 through the valve member 7 with the second chamber part 14.

In the preferred design of the working example the expansion recesses 38 and the additional expansion recesses 45 constitute a first group 47 of mutually parallel groove-like recesses, which are produced in the first valve member area 34. For the production of the relief ducts 43 and the additional relief ducts 46 the valve member 7 is provided with a second group 48 of mutually parallel groove-like recesses 52 on the opposite second valve member area 34'. Such recesses run athwart the recesses of the first group 47 so that there is a crossed over arrangement, the depth of the recesses of the two groups 47 and 48 being so selected that the recesses on either side merge at the points of intersection. The transition zones 53 between the recesses of the two groups 47 and 48 thus form, jointly with the recesses 52, the relief ducts 43 and any additional relief ducts 46.

It is preferred for the duct layer 3 and the valve member layer 5 to be of [110] silicon, the desired micromechanical structures being produced by etching. The covering layer 6 is preferably fabricated of the same material. For the connection layer 4 glass material is particularly suitable. However other materials are able to be employed, as for instance plastic materials which may be microfabricated using conventional molding methods.

Instead of a plate-like, rigid valve member 7 it would be possible to use an at least partially bendingly flexible and for example diaphragm-like design. In the case of diaphragm-like designs a fully elastic form of the plastic material is suitable.

What is claimed is:

1. A microvalve comprising:
   a duct layer having an input flow opening communicating with an input flow duct and at least one output flow opening communicating with an output flow duct; and
   a plate-like valve member having a first surface and a second surface opposite said first surface, said first surface, together with said duct layer, defining a first chamber therebetween and said second surface defining a second chamber, said first chamber communicating with said input flow opening and said output flow opening of said duct layer, and wherein said valve member is able to be shifted between a closed position closing the input flow opening and an open position opening the input flow opening and thus rendering possible transfer of fluid from the input flow duct to the output flow duct through the first chamber, said valve member further including a first recess opposite the output flow opening and a second recess adjacently spaced from said first recess, said first and second recesses extending along a length thereof and providing fluid communication through the valve member between the first and the second chamber for relieving fluid pressure in said first chamber while reducing the pressure forces acting on said valve member when said valve member is in said open position, and in that the switching operations are caused by electrostatic switching forces acting on the valve member,
   wherein said first recess is substantially aligned with said output flow opening regardless of the position of said valve member and said second recess is not in alignment with either said input flow opening or said output flow opening.

2. The microvalve as set forth in claim 1, wherein the first recess has the same width as the output flow opening opposite to it.

3. The microvalve as set forth in claim 1, wherein at least one of the first and second recess is in the form of a slot-like cutout extending through the valve member for its entire thickness and furthermore extending athwart the transfer direction of the fluid.

4. The microvalve as set forth in claim 1, wherein at least one of the first and second recess is groove-like and of elongated configuration and extends athwart the transfer direction, said recess communicating via at least one relief duct, which extends through the valve member, with the second chamber part.

5. The microvalve as set forth in claim 4 wherein at least one of the first and second recess communicates simultaneously via several relief ducts with the second chamber part, which ducts open at positions, placed in sequence in the longitudinal direction of the recess at a distance apart, into the recess.

6. The microvalve as set forth in claim 1, wherein the output flow opening and the first recess are slot-like in configuration.

7. The microvalve as set forth in claim 6, characterized by a mutually parallel course of the slot-like openings (17, 22, 23 and 42).

8. The microvalve as set forth in claim 6, characterized by a linear configuration of the slot-like openings (17, 22, 23 and 42).

9. The microvalve as set forth in claim 6, wherein the input flow opening is flanked on opposite sides by respectively one output flow opening, each output flow opening being opposite to a recess.

10. The microvalve as set forth in claim 9, wherein on the oppositely facing longitudinal sides of the two recesses respectively at least one additional recess is provided.

11. The microvalve as set forth in claim 1, wherein a group of mutually parallel groove-like recesses is provided in the two valve member faces facing the chamber parts, the recesses of both groups extending transversely in relation to each other and having depths that merge with each other, the recess associated with the first chamber part including the first and second recess.

12. The microvalve as set forth in claim 1, wherein the region, opposite to the input flow opening of the valve member constitutes a closure region covering the input flow opening in the closed position, which closure region is flanked on opposite sides respectively by the first and second recess.

13. The microvalve as set forth in claim 1, characterized in that the second chamber part (15) is delimited by a covering layer (6) free of ducts or by a further duct layer containing at least one fluid duct.

14. The microvalve as set forth in claim 1, characterized in that the valve member (7) is a moving component of a valve member layer (5) arranged on the duct layer (3).

15. A microvalve comprising:
   a duct layer having an input flow opening communicating with an input flow duct and at least one output flow opening communicating with an output flow duct; and
   a plate-like valve member having a first surface and a second surface opposite said first surface, said first surface, together with said duct layer, defining a first chamber therebetween and said second surface defining a second chamber, said first chamber communicating with said input flow opening and said output flow opening of said duct layer, and wherein said valve member is able to be shifted between a closed position closing the input flow opening and an open position opening the input flow opening and thus rendering possible transfer of fluid from the input flow duct to the output flow duct through the first chamber, said valve member further including a first recess opposite the output flow opening and a second recess adjacently spaced from said first recess, said first and second recesses providing fluid communication through the valve member between the first and the second chamber for relieving fluid pressure in said first chamber while reducing the pressure forces acting on said valve member when said valve member is in said open position, and in that the switching operations are caused by electrostatic switching forces acting on the valve member, wherein the output flow opening and the input flow opening comprise slots formed in the duct layer and wherein the first recess and the second recess comprise slots formed in the valve member and wherein said first recess is substantially aligned with said output flow opening regardless of the position of said valve member and said second recess is not in alignment with either said input flow opening or said output flow opening.

* * * * *